US011837262B2

(12) United States Patent
Baek et al.

(10) Patent No.: US 11,837,262 B2
(45) Date of Patent: Dec. 5, 2023

(54) ELECTRONIC DEVICE FOR TAGGING EVENT IN SPORTS PLAY VIDEO AND OPERATING METHOD THEREOF

(71) Applicant: NAVER CORPORATION, Seongnam-si (KR)

(72) Inventors: Jun Bong Baek, Seongnam-si (KR); Hoonmok Moon, Seongnam-si (KR); Ha Kyoung Sung, Seongnam-si (KR); DongHo Lee, Seongnam-si (KR); YoungNam Kang, Seongnam-si (KR); HyunJoong Park, Seongnam-si (KR); Seoyeon Hur, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 4 days.

(21) Appl. No.: 17/104,397

(22) Filed: Nov. 25, 2020

(65) Prior Publication Data

US 2021/0166734 A1 Jun. 3, 2021

(30) Foreign Application Priority Data

Nov. 29, 2019 (KR) .................. 10-2019-0157692
Oct. 16, 2020 (KR) .................. 10-2020-0134509

(51) Int. Cl.
*G11B 27/34* (2006.01)
*G11B 27/30* (2006.01)
*H04N 21/845* (2011.01)
*G11B 27/10* (2006.01)
*H04N 21/435* (2011.01)
(Continued)

(52) U.S. Cl.
CPC .............. *G11B 27/34* (2013.01); *G11B 27/30* (2013.01); *H04N 21/8455* (2013.01)

(58) Field of Classification Search
USPC .................................................. 386/239–248
See application file for complete search history.

(56) References Cited

U.S. PATENT DOCUMENTS 9,186,548 B2 * 11/2015 House .................... G11B 27/13
10,456,657 B1 * 10/2019 McCartin ............ A63B 71/0669
(Continued)

FOREIGN PATENT DOCUMENTS

JP 2007049662 A * 2/2007
KR 1020140139859 A 12/2014
(Continued)

OTHER PUBLICATIONS

Naver Sports; "KBO League Scoring Highlight' service edited by AI"; Aug. 29, 2019 https://sports.news.naver.com/news/print.nhn?oid=109&aid=0004076303.
(Continued)

*Primary Examiner* — Hung Q Dang
(74) *Attorney, Agent, or Firm* — GREER BURNS & CRAIN, LTD.

(57) ABSTRACT

An electronic device for tagging an event in a sports play video, and an operating method thereof. Various embodiments may include mapping text broadcasting data and a sports play video based on an event occurring during sports play, detecting a tagging location of the event in the sports play video, and displaying an indicator for the tagging location of the event in the progress bar of the sports play video.

13 Claims, 14 Drawing Sheets

(51) Int. Cl.
*H04N 21/44* (2011.01)
*H04N 21/472* (2011.01)

(56) References Cited

U.S. PATENT DOCUMENTS

| | | | | |
|---|---|---|---|---|
| 2003/0093790 | A1* | 5/2003 | Logan | G11B 27/34 |
| | | | | 725/38 |
| 2009/0083787 | A1* | 3/2009 | Morris | H04N 21/8133 |
| | | | | 725/32 |
| 2012/0087640 | A1* | 4/2012 | Kitamura | H04N 21/80 |
| | | | | 386/281 |
| 2015/0331856 | A1* | 11/2015 | Choi | G06Q 50/01 |
| | | | | 707/746 |
| 2015/0373306 | A1* | 12/2015 | Flores | H04N 21/6175 |
| | | | | 348/157 |
| 2016/0217325 | A1* | 7/2016 | Bose | G11B 27/17 |
| 2018/0199080 | A1* | 7/2018 | Jackson, Jr. | H04N 21/2187 |
| 2019/0013047 | A1* | 1/2019 | Wait | G06K 9/00751 |
| 2019/0043201 | A1* | 2/2019 | Strong | G06K 9/6228 |
| 2019/0076741 | A1* | 3/2019 | Thompson | H04N 21/25891 |
| 2019/0205652 | A1* | 7/2019 | Ray | G06V 20/47 |
| 2019/0266407 | A1* | 8/2019 | Gupta | G06K 9/00724 |
| 2019/0354763 | A1* | 11/2019 | Stojancic | H04N 21/23418 |
| 2021/0064880 | A1* | 3/2021 | Zhang | G06K 9/6276 |

FOREIGN PATENT DOCUMENTS

| | | |
|---|---|---|
| KR | 1020150006624 A | 1/2015 |
| KR | 1020150118002 A | 10/2015 |
| KR | 1020190016758 A | 2/2019 |

OTHER PUBLICATIONS

Naver Sports; "Professional Baseball'View all at bat videos' support"; Jul. 30, 2020 https://news.naver.com/main/read.nhn?mode=LPOD&mid=sec&sid1=&oid=092&aid=0002195153.
Baek, Jun Bong, U.S. Appl. No. 17/103,199, filed Nov. 24, 2020.
Office Action issued in corresponding to Korean patent application No. 10-2020-0134509, dated Nov. 29, 2021.
Office Action issued in corresponding Korean patent application No. 10-2020-0134509, dated Jun. 23, 2022.

* cited by examiner

ELECTRONIC DEVICE FOR TAGGING EVENT IN SPORTS PLAY VIDEO AND OPERATING METHOD THEREOF

CROSS REFERENCE TO RELATED APPLICATION

This application claims priority under 35 U.S.C. § 119 to Korean Patent Application Nos. 10-2019-0157692 filed on Nov. 29, 2019, which is incorporated herein by reference in its entirety, and 10-2020-0134509 filed on Oct. 16, 2020, which is also incorporated herein by reference in its entirety.

BACKGROUND OF THE INVENTION

1. Technical Field

Various embodiments relate to an electronic device for tagging an event occurring in video of a sport being played (also referred to herein as "a sports play video"), and an operating method thereof.

2. Description of the Related Art

In general, a sports play video is provided. Some users want to watch a specific situation occurring during a sport being played again. However, electronic devices do not provide a service for such user's needs while providing a sports play video. That is, a user cannot watch a specific situation that previously occurred during the sport being played while watching a sports play video in which the sports play is being broadcasted live. Furthermore, it is difficult for the user to watch the specific situation because he or she has to attempt to intuitively search for the desired specific situation that occurred during the playing of the sport while watching the recorded sports play video.

SUMMARY OF THE INVENTION

Various embodiments provide an electronic device for tagging an event indicative of a specific situation occurring in video of a sport being played (also referred to herein as "a sports play video"), and an operating method thereof.

Furthermore, various embodiments provide an electronic device which enables a service user to confirm the location in the video where an event occurs while watching a sports play video, and an operating method thereof.

According to various embodiments, an operating method of an electronic device may include mapping text broadcasting data and a sports play video based on an event occurring during sport being played, detecting a tagging location of the event in the sports play video, and displaying an indicator for the tagging location of the event in the progress bar of the sports play video.

According to various embodiments, a program for executing the operating method in the electronic device is written in a non-transitory computer-readable recording medium.

According to various embodiments, an electronic device includes a memory and a processor coupled to the memory and configured to execute at least one instruction stored in the memory. The processor may be configured to map text broadcasting data and a sports play video based on an event occurring during the sport being played, detect a tagging location of the event in the sports play video, and display an indicator for the tagging location of the event in the progress bar of the sports play video.

DETAILED DESCRIPTION

Hereinafter, various embodiments of this document are described with reference to the accompanying drawings.

In this document, the term "event" may mean an operation or an incident occurring during sports play. For example, the sport being played in the video may be baseball, soccer, golf, etc. For example, if sport being played is baseball, the event may include at least one of pitching, a home run, a hit or a score. For another example, if the sport being played is soccer, the event may include at least one of scoring or shooting. For still another example, if the sport being played is golf, the event may include a shot.

In this document, "text broadcasting data" may mean text data that broadcasts a real-time situation of the sport being played. In this case, the text broadcasting data indicates a history of events, and may include identification information and an actual timing point of each event, for example. In this document, a "sports play video" may mean video data that broadcasts a sport being played. In this case, the sports play video may include at least one of a video in which the sport being played is broadcast live or a video that is recorded and then later broadcasted.

Figure 1:
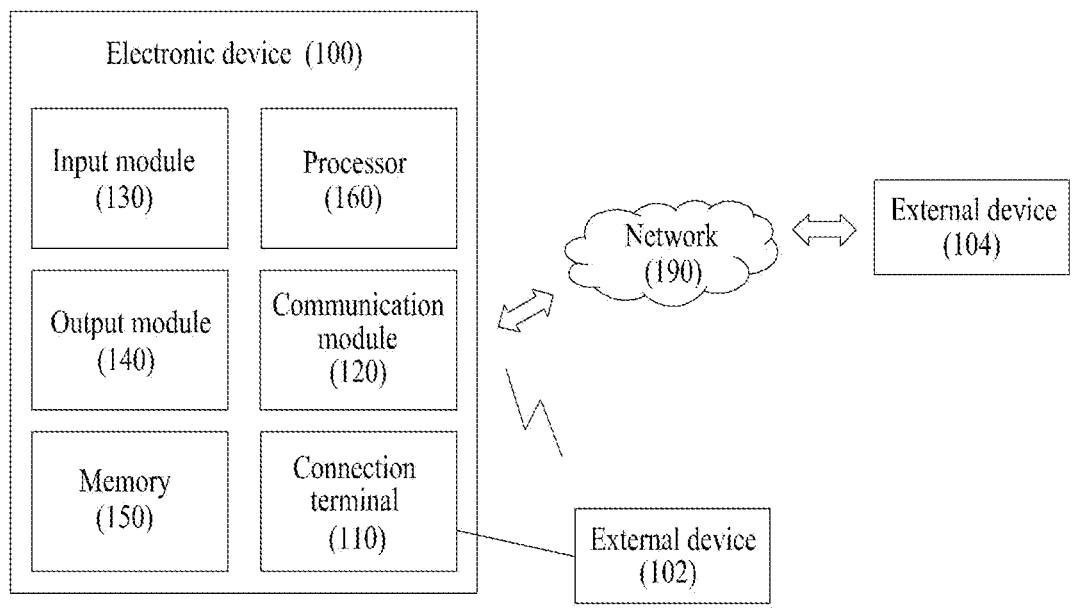
FIG. 1 is a diagram illustrating an electronic device according to various embodiments.
Figure 2:
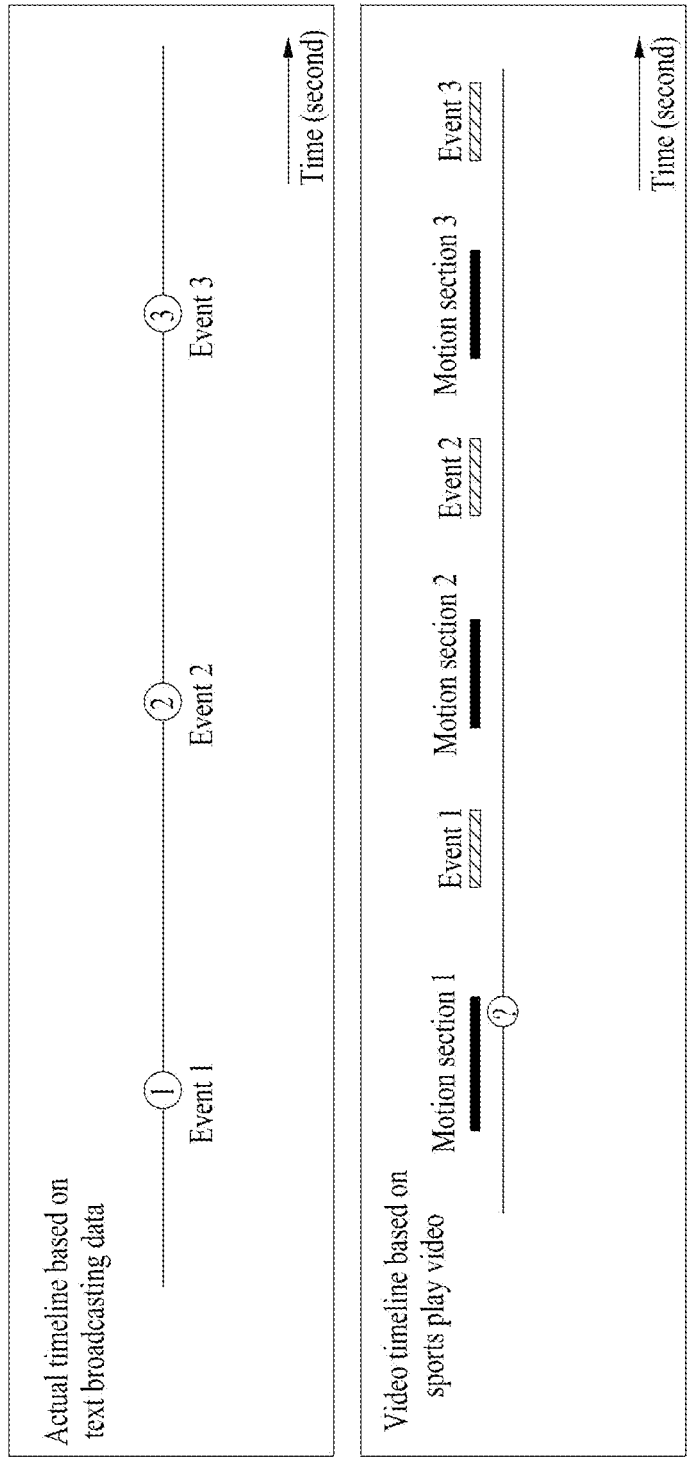
FIG. 2 illustrates diagrams for describing operation features of the electronic device according to various embodiments.
Figure 3A:
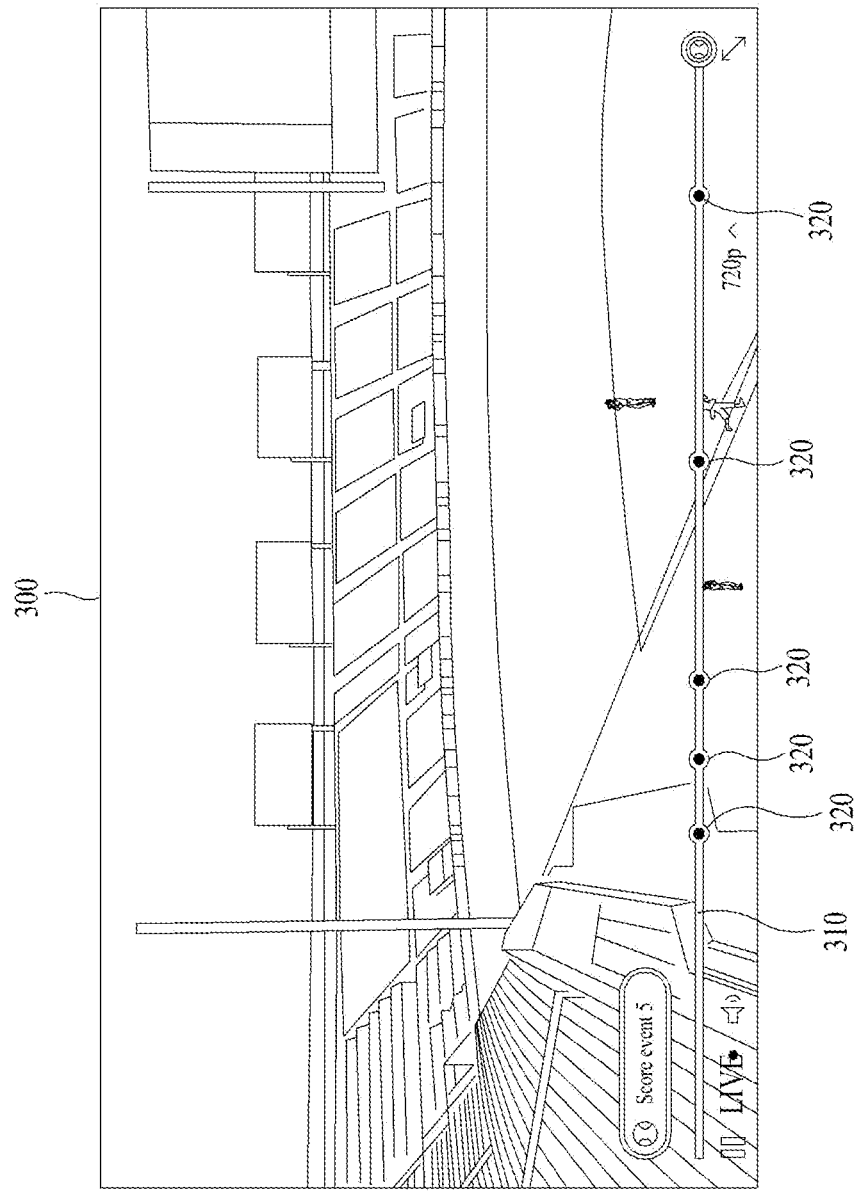
FIGS. 3A, 3B and 3C are diagrams for describing services provided by the electronic device according to various embodiments.
Figure 3B:
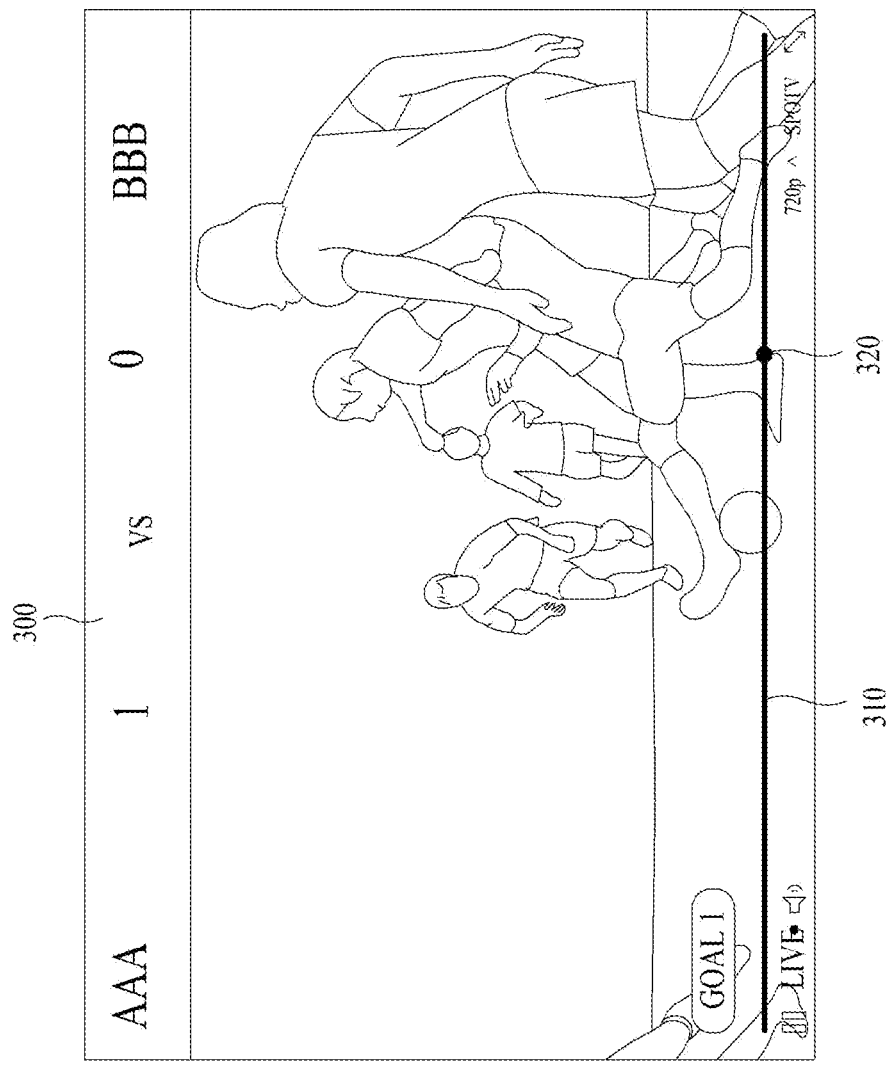
Figure 3C:
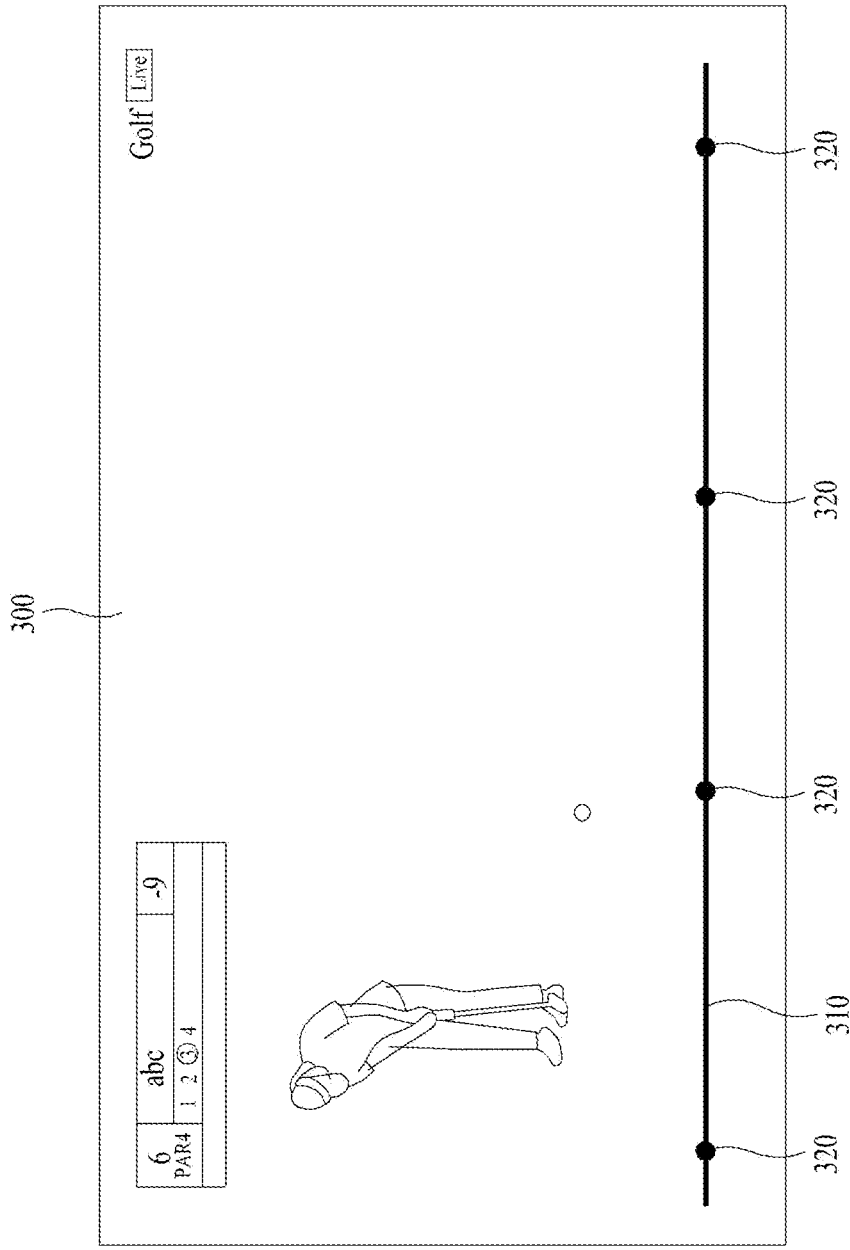

FIG. 1 is a diagram illustrating an electronic device 100 according to various embodiments. FIG. 2 illustrates diagrams for describing operational features of the electronic device 100 according to various embodiments. FIGS. 3A, 3B and 3C are diagrams for describing services provided by the electronic device 100 according to various embodiments.

Referring to FIG. 1, the electronic device 100 according to various embodiments may include at least one of a connection terminal 110, a communication module 120, an input module 130, an output module 140, a memory 150, and a processor 160. In some embodiments, at least one of the elements of the electronic device 100 may be omitted, and at least another element may be added to the elements of the electronic device 100. In some embodiments, at least any two of the elements of the electronic device 100 may be implemented as a single integrated circuit. In this case, the electronic device 100 may be a single server or may include a plurality of servers. According to one embodiment, the electronic device 100 may be a server for tagging an event in video of a sport being played (also referred to herein as "a sports play video"). According to another embodiment, the electronic device 100 may include a server for tagging an event in a sports play video, and may further include at least one of a server for live broadcasting a sports play video during sports play or a server for providing text broadcasting data during sports play.

The connection terminal 110 of the electronic device 100 may be physically connected to an external device 102. For example, the external device 102 may consist of another electronic device, as described below. To this end, the connection terminal 110 may include at least one connector. For example, the connector may include at least one of an HDMI connector, a USB connector, an SD card connector, or an audio connector.

The communication module 120 of the electronic device 100 may perform communication with the external device 102 (or with additional external device 104). The communication module 120 may set up a communication channel between the electronic device 100 and the external device 102, 104, and may perform communication with the external device 102, 104 through the communication channel. The communication module 120 may include at least one of a wired communication module and a wireless communication module. The wired communication module is connected to the external device 102 in a wired manner through the connection terminal 102, and may communicate with the external device 102 in a wired manner. The wireless communication module may include at least one of a short-distance communication module or a long-distance communication module. The short-distance communication module may communicate with the external device 102 using a short-distance communication method. For example, the short-distance communication method may include at least one of Bluetooth, WiFi direct, or infrared data association (IrDA). The long-distance communication module may communicate with the external device 104 using a long-distance communication method. In this case, the long-distance communication module may communicate with the external device 104 over a network 190. For example, the network 190 may include at least one of a cellular network, the Internet, or a computer network, such as a local area network (LAN) or a wide area network (WAN).

In this case, the external device 102, 104 may include at least one of another server, an electronic device, a satellite and a base station. For example, the electronic device may include at least one of a smart phone, a mobile phone, a navigation device, a computer, a notebook, a terminal for digital broadcasting, a personal digital assistants (PDA), a portable multimedia player (PMP), a tablet PC, a game console, a wearable device, an Internet of things (IoT) device, home appliances, a medical device, and a robot. According to one embodiment, when the electronic device 100 is a server for tagging an event in a sports play video, another server may include at least one of a server for live broadcasting of a sports play video during sports play or a server for providing text broadcasting data during sports play. In this case, the electronic device may check the tagging of an event in a sports play video by the electronic device 100 while the sports play video is being broadcasted.

The input module 130 may receive a signal to be used for at least one of the elements of the electronic device 100. The input module 130 may include at least one of an input device configured to enable a user to directly input a signal to the electronic device 100, a sensor device configured to generate a signal by sensing a surrounding environment, and a camera module configured to generate video data by recording a video. For example, the input device may include at least one of a microphone, a mouse, and a keyboard. In some embodiments, the sensor device may include at least one of touch circuitry configured to sense a touch and a sensor circuit configured to measure the intensity of a force generated by a touch.

The output module 140 may output information. The output module 140 may include at least one of a display module configured to visually display information and an audio module configured to acoustically play back information. For example, the display module may include at least one of a display, a hologram device and a projector. For example, the display module may be implemented as a touch screen by being assembled with at least one of the touch circuitry and sensor circuit of the input module 130. For example, the audio module may include at least one of a speaker and a receiver.

The memory 150 may store various data used by at least one of the elements of the electronic device 100. For example, the memory 150 may include at least one of a volatile memory and a non-volatile memory. The data may include at least one program, and input data or output data related to the at least one program. The program may be stored in the memory 150 as software including at least one instruction, and may include at least one of an operating system, middleware and an application, for example.

The processor 160 may control at least one of the elements of the electronic device 100 by executing a program stored in the memory 150. Accordingly, the processor 160 may perform data processing or an operation. In this case, the processor 160 may execute instructions stored in the memory 150. The processor 160 may provide the tagging of an event with respect to a sports play video. To this end, the processor 160 may detect a tagging location for the tagging of an event in the sports play video. In this case, the processor 160 may detect the tagging location of each event in the sports play video using text broadcasting data of the sports play.

According to various embodiments, the processor 160 may map text broadcasting data and a sports play video based on an event occurring during sports play. For example, if the sport being played is baseball, an event may include at least one of a score, a home run or the first pitch for each batter. For another example, if the sport being played is soccer, an event may include a score. For still another example, if the sport being played is golf, an event may include a tee shot for each hole. The processor 160 may confirm a location where an event occurs in a sports play video. In this case, the occurrence location merely indicates a temporal location within the sports play video, and does not indicate an actual time. The processor 160 may confirm the location where the event occurs in the sports play video by recognizing the score board of the sports play video. For example, as illustrated in FIG. 2, the processor 160 may confirm a location where an event occurs in a video timeline that has been defined based on a sports play video. Furthermore, the processor 160 may confirm each of the actual timing points of events in text broadcasting data. For example, as illustrated in FIG. 2, the processor 160 may check an actual timing point of an event in an actual timeline defined based on text broadcasting data. Accordingly, the processor 160 may map an occurrence location and the actual timing point based on an event. In this case, the processor 160 may map the occurrence location and the actual timing point in order of events occurred.

According to various embodiments, the processor 160 may detect the tagging location of an event in a sports play video. The processor 160 may recognize a predetermined motion in association with the event in proximity to the location of the occurrence in the sports play video. In this case, the motion may indicate an action of at least one object matching at least one predetermined condition in association with the event. For example, the object may include at least one of a person or a thing. For example, if the sport being played is baseball, the motion may include at least one of a swing motion or a pitching motion. For another example, if the sport being played is soccer, the motion may include at least one of a pass motion for conversion between offense and defense or a shooting motion. For still another example, if the sport being played is golf, the motion may include at least one of a swing motion or a putting motion. For example, as illustrated in FIG. 2, the processor 160 may check a motion section neighboring an occurrence location based on a motion in a video timeline. Furthermore, the processor 160 may detect the tagging location of an event based on a motion. For example, as illustrated in FIG. 2, the processor 160 may detect a tagging location in accordance with a motion section in a video timeline.

According to various embodiments, the processor 160 may display an indicator for the tagging location of an event in a progress bar, while displaying the progress bar of a sports play video. In this case, the progress bar corresponds to the progress time period of the sports play video. The processor 160 may assign the indicator the tagging location in the progress time period of the sports play video. For example, if a sports play video is a video in which sports play is being broadcast live, the progress time period of the sports play video may be a time period from an initial timing point at which the sports play video starts to a current timing point. For another example, if a sports play video is a video in which sports play is recorded and then later broadcasted, the progress time period of the sports play video may be a total time period of the sports play video. Accordingly, the processor 160 may proportionally check a tagging location in the progress time period of the sports play video, and may display the indicator of an event at the tagging location. In this case, the indicator may have various shapes and sizes.

For example, as illustrated in each of FIGS. 3A, 3B and 3C, the processor 160 may display an indicator 320 for the tagging location of an event in the progress bar 310 of a sports play video 300. For example, if the sport being played is baseball and an event is a score, as illustrated in FIG. 3A, the indicator 320 for the tagging location of each score may be displayed in the progress bar 310 of the sports play video 300 for baseball. For another example, if the sport being played is soccer and an event is a score, as illustrated in FIG. 3B, the indicator 320 for the tagging location of each score may be displayed in the progress bar 310 of the sports play video 300 for soccer. For still another example, if the sport being played is golf and an event is a tee shot for each hole, as illustrated in FIG. 3C, the indicator 320 for the tagging location of a tee shot for each hole may be displayed in the progress bar 310 of the sports play video 300 for golf. Accordingly, while watching the sports play video 300 using the electronic device, a service user may predict a location where an event occurs in the progress time period of the sports play video 300 based on the progress bar 310 and the indicator 320.

In some embodiments, the processor 160 may provide tagging information in at least some of the sports play video 300. To this end, the processor 160 may generate the tagging information using at least one of text broadcasting data or the sports play video 300. In this case, the tagging information may indicate information related to at least one of an event or the tagging location of the event. According to one embodiment, when a service user selects the indicator 320 while watching the sports play video 300 using the electronic device, the processor 160 may provide, in at least some of the sports play video 300, tagging information related to the tagging location of the selected indicator 320. In this case, the tagging information may include at least one of information on the event of the selected indicator 320 or an event history up to the tagging location of the selected indicator 320. For example, the tagging information may include at least one of at least some of the text broadcasted through text broadcasting data at an actual timing point of an event, the thumbnail of an event detected in the sports play video 300, or a partial video of an event detected in the sports play video 300. In this case, the partial video may be detected so that it starts from a tagging location in the sports play video 300. According to another embodiment, when a service user selects one location through the progress bar 310 while watching the sports play video 300 using the electronic device, the processor 160 may provide, in at least some of the sports play video, an event history up to the selected location in the sports play video. In this case, the event history may indicate a list of pieces of tagging information.

Figure 4:
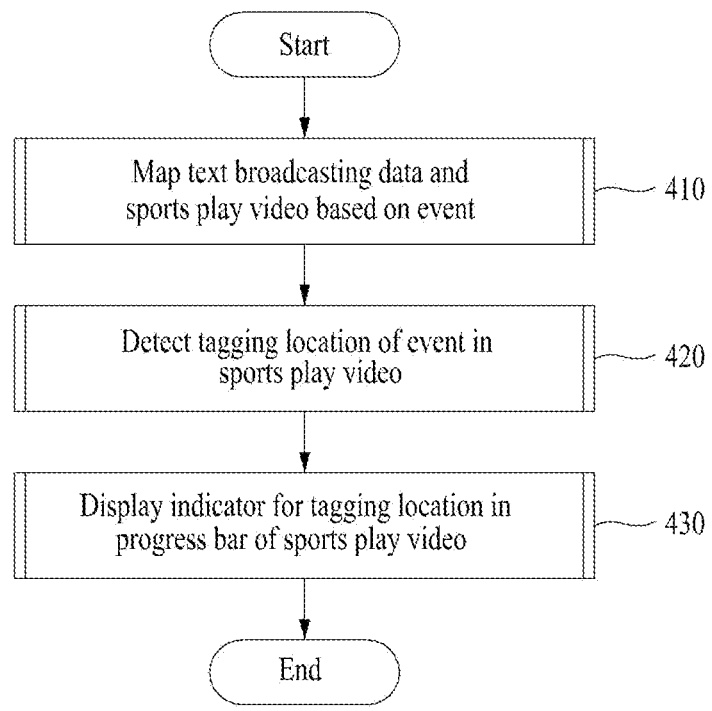
FIG. 4 is a diagram illustrating an operating method of the electronic device according to various embodiments.
Figure 5:
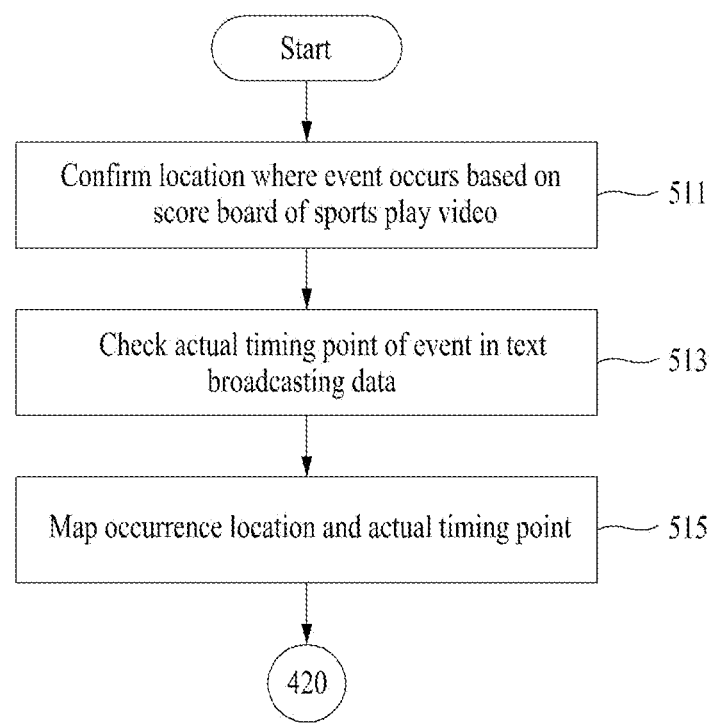
FIG. 5 is a diagram illustrating the step of mapping text broadcasting data and a sports play video based on an event of FIG. 4.
Figure 6:
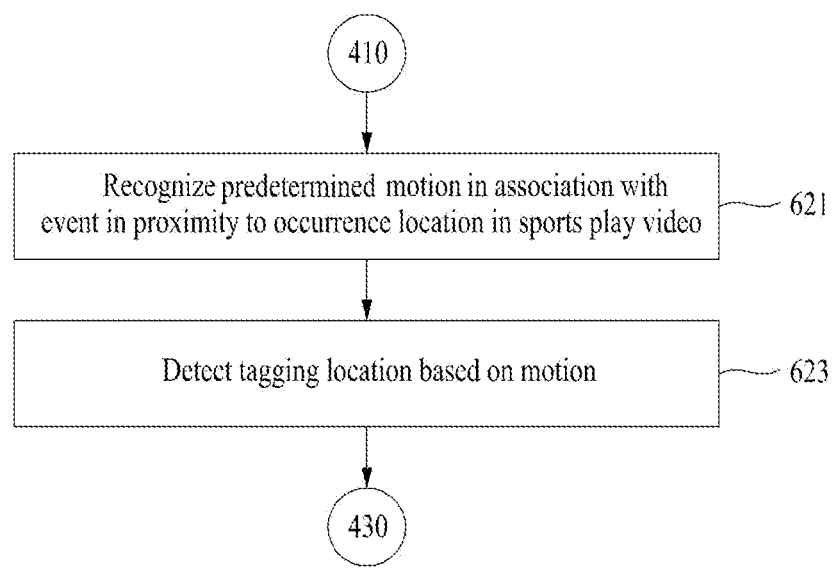
FIG. 6 is a diagram illustrating the step of detecting the tagging location of the event in the sports play video of FIG. 4.
Figure 7:
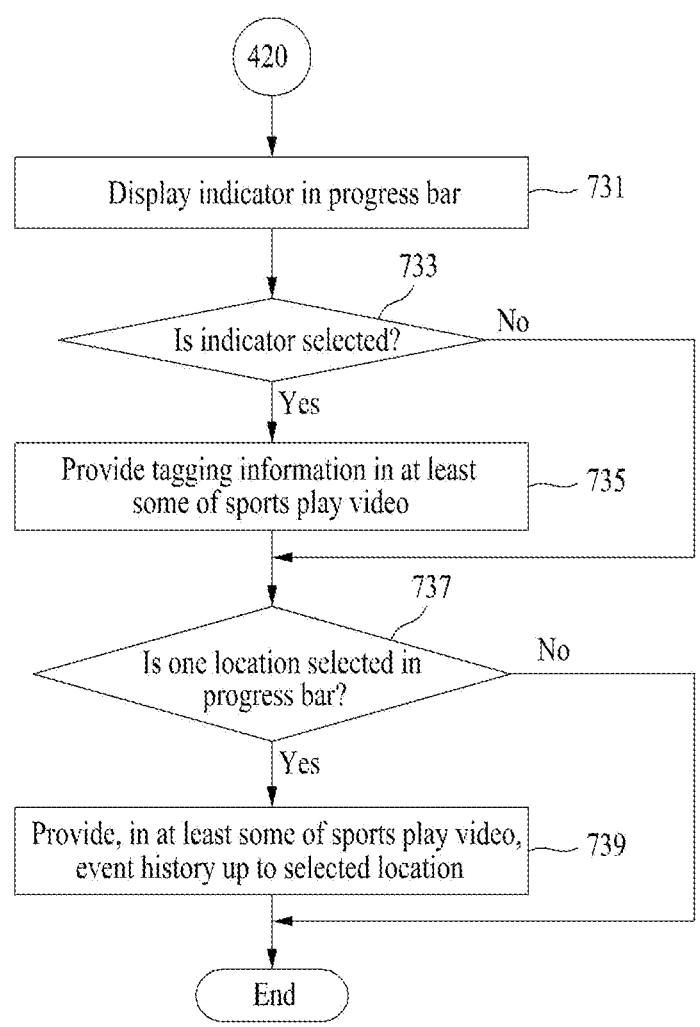
FIG. 7 is a diagram illustrating the step of displaying an indicator for the tagging location in the progress bar of the sports play video of FIG. 4.

FIG. 4 is a diagram illustrating an operating method of the electronic device 100 according to various embodiments. FIG. 5 is a diagram illustrating the step (step 410) of mapping text broadcasting data and a sports play video based on an event of FIG. 4. FIG. 6 is a diagram illustrating the step (step 420) of detecting the tagging location of the event in the sports play video of FIG. 4. FIG. 7 is a diagram illustrating the step (step 430) of displaying an indicator for the tagging location in the progress bar of the sports play video of FIG. 4. FIGS. 8, 9, 10, 11 and 12 are diagrams for describing an operating method of the electronic device 100 according to an embodiment.

Referring to FIG. 4, at step 410, the electronic device 100 may map text broadcasting data and a sports play video for sports play. The processor 160 may map the text broadcasting data and the sports play video based on an event occurring during the sports play. For example, if the sport being played is baseball, the event may include at least one of a score, a home run or the first pitch for each batter. For another example, if the sport being played is soccer, the event may include a score. For still another example, if the sport being played is golf, the event may include a tee shot for each hole. This will be more specifically described with reference to FIG. 5.

Referring to FIG. 5, at step 511, the electronic device 100 may confirm a location where an event occurs in the sports play video.

In this case, the occurrence location merely indicates a temporal location in the sports play video, and does not indicate an actual time. In this case, the processor 160 may confirm the location where the event occurs in the sports play video by recognizing the score board of the sports play video. For example, as illustrated in FIG. 2, the processor 160 may confirm a location where an event occurs in a video timeline defined based on a sports play video.

Figure 8:
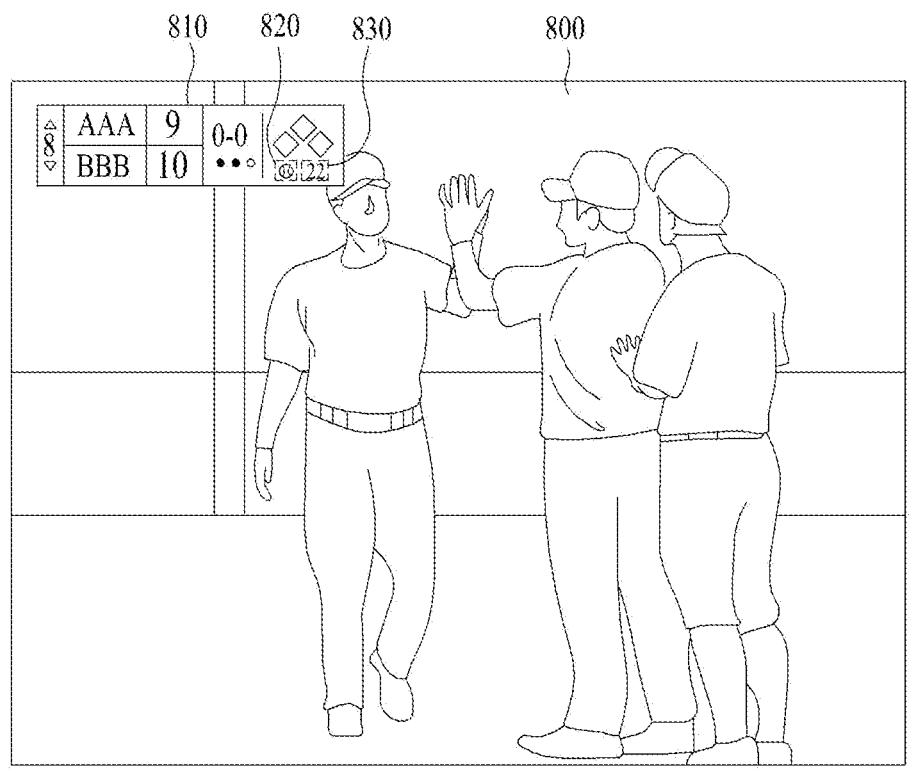
FIGS. 8, 9, 10, 11 and 12 are diagrams for describing an operating method of the electronic device according to an embodiment.

According to one embodiment, the processor 160 may continuously track a score board 810 in the sports play video 800. In this case, as illustrated in FIG. 8, the processor 160 may recognize the score board 810 in the sports play video 800. In this case, the processor 160 may detect the area of the score board 810 in the sports play video 800 using an artificial intelligence module, such as YOLOv3. Furthermore, the processor 160 may recognize an event count 830 in the score board 810. In this case, the event count 830 is a number. The processor 160 may recognize the event count 830 using a vision module, such as an optical character reader (OCR). Accordingly, the processor 160 may confirm a location where an event occurs in response to a change in the event count 830. That is, the processor 160 may monitor a change in the event count 830 while tracking the score board 810, and thus may confirm the location where the event occurs. For example, if the sport being played is baseball, an event may indicate each pitch. The event count 830 may indicate a cumulative pitching number in the sports play. For another example, if the sport being played is soccer, an event may indicate each score. The event count 830 may indicate a total score in the sport being played.

For example, as illustrated in FIG. 8, the processor 160 may identify a predetermined index 820 in the score board 810. The index 820 may have at least one of a predetermined shape or size. For example, if sport being played is baseball, the index 820 may have a baseball shape. In this case, the processor 160 may identify the index 820 by performing template matching, for example, and thus may detect the location of the index 820 in the score board 810. Thereafter, as illustrated in FIG. 8, the processor 160 may recognize the event count 830 based on the index 820 in the score board 810. In this case, the processor 160 may predict a location of the event count 830 based on a location of the index 820 in the score board 810. To this end, the location of the event count 830 may be predetermined based on the location of the index 820. For example, the location of the event count 830 may be determined as at least one of the right, left, upper part or lower part of the location of the index 820. The processor 160 may recognize the event count 830 at a predicted location. Accordingly, the processor 160 may monitor a change in the event count 830 while tracking the score board 810, and thus may confirm a location where each event occurs.

At step 513, the electronic device 100 may check an actual timing point of the event in text broadcasting data. For example, as illustrated in FIG. 2, the processor 160 may check the actual timing point of the event in an actual timeline is defined based on text broadcasting data.

At step 515, the electronic device 100 may map the occurrence location and the actual timing point based on the event. The processor 160 may map the occurrence location and the actual timing point in the order that the events occurred.

Thereafter, the electronic device 100 may return to FIG. 4 and proceed to step 420.

Referring back to FIG. 4, at step 420, the processor 160 of the electronic device 100 may detect the tagging location of the event in the sports play video. The processor 160 may detect the tagging location of the event based on a predetermined motion in association with the event in the sports play video. In this case, the motion may indicate an action of at least one object that matches at least one condition predetermined in association with the event. For example, the object may include at least one of a person or a thing. For example, if the sport being played is baseball, the motion may include at least one of a swing motion or a pitching motion. For another example, if the sport being played is soccer, the motion may include at least one of a pass motion for conversion between offense and defense or a shooting motion. For still another example, if the sport being played is golf, the motion may include at least one of a swing motion or a putting motion. This will be more specifically described with reference to FIG. 6.

Referring to FIG. 6, at step 621, the electronic device 100 may recognize a predetermined motion in association with an event in proximity to an occurrence location in a sports play video. At this time, the processor 160 may track an action of at least one object in the sports play video. Furthermore, the processor 160 may recognize the predetermined motion from the actions. The processor 160 may recognize the motion using an artificial intelligence (AI) module, such as a tensorflow object detection model, and a rule-based algorithm, for example. In this case, the motion may indicate one action or a combination of a plurality of actions that matches at least one condition predetermined in relation to the event. Furthermore, the processor 160 may check a motion section for the motion in proximity to the occurrence location in the sports play video. For example, as illustrated in FIG. 2, the processor 160 may check a motion section neighboring an occurrence location based on a motion in the video timeline.

Figure 9:
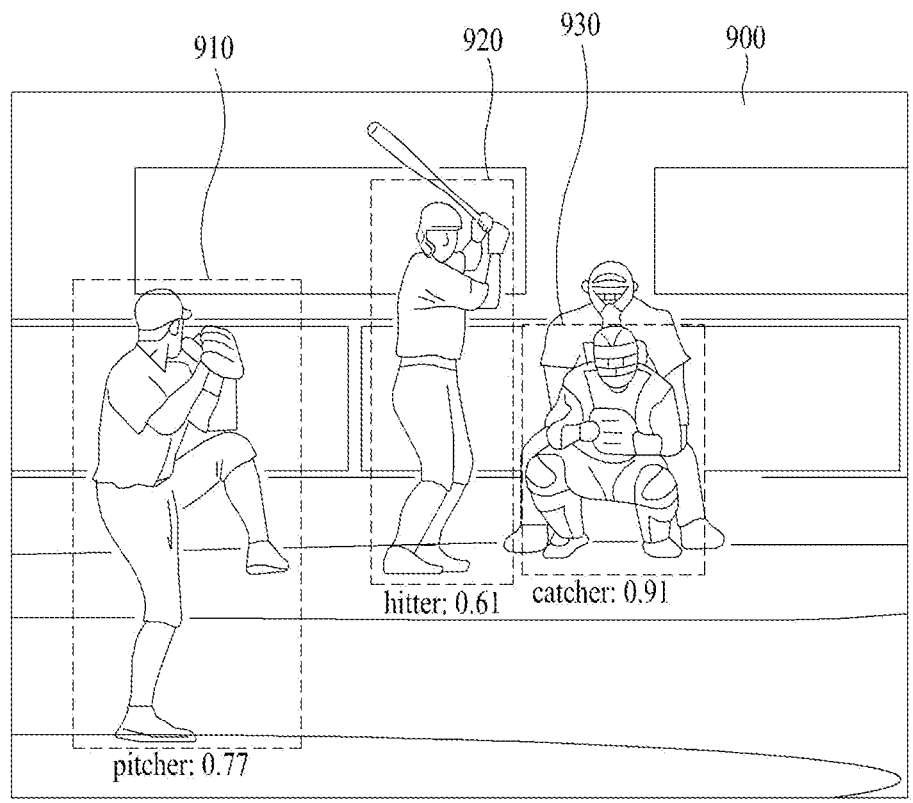

According to one embodiment, as illustrated in FIG. 9, the processor 160 may track a plurality of actions of objects 910, 920, and 930 in a sports play video 900. In this case, the processor 160 may track the actions of the objects 910, 920, and 930 by comparing frames of the sports play video 900 according to an image analysis scheme. Accordingly, the processor 160 may recognize a predetermined motion in the actions. For example, if the sport being played is baseball, an event may indicate each pitch, and a motion may include a pitching motion. In this case, the pitching motion is determined as a combination of the actions of the pitcher 910, the hitter 920, and the catcher 930, and may be determined as at least one of a condition in which the hitter 920 has to be positioned between the pitcher 910 and the catcher 930, a condition in which the location of the head of the catcher 930 has to be lower than the location of the head of the hitter 920, or a condition in which the foot placement of the pitcher 910 has to be lower than the foot placement of the catcher 930. Accordingly, the processor 160 may confirm each of motion sections between occurrence locations in accordance with a motion in a sports play video.

At step 623, the processor 160 may detect the tagging location of the event based on the motion. For example, as illustrated in FIG. 2, the processor 160 may detect the tagging location in accordance with a motion section in the video timeline.

Thereafter, the electronic device 100 may return to FIG. 4 and proceed to step 430.

Figure 10:
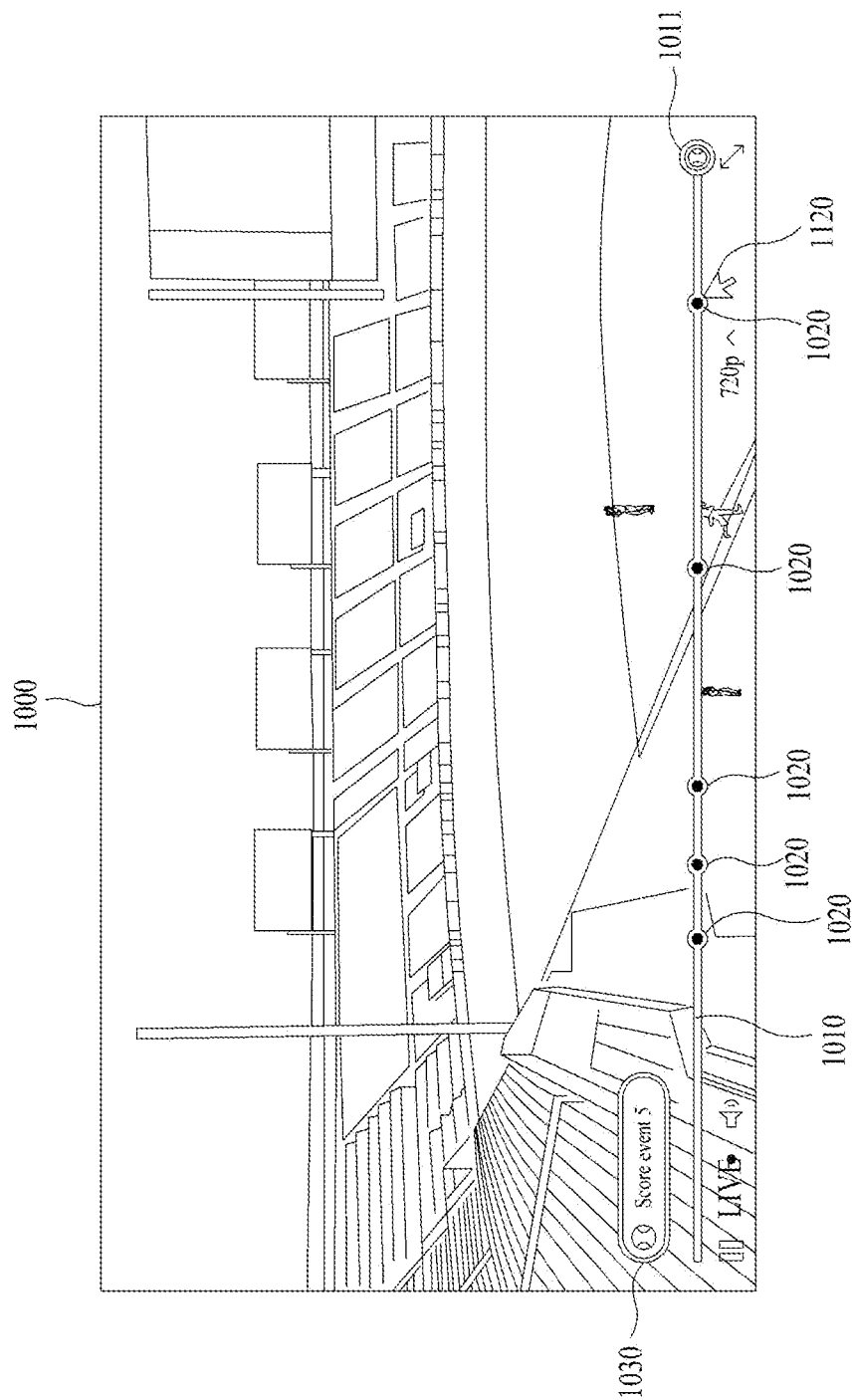

Referring back to FIG. 4, at step 430, the electronic device 100 may display an indicator for the tagging location of the event in a progress bar while displaying the progress bar of the sports play video. In this case, the progress bar corresponds to the progress time period of the sports play video. The processor 160 may assign the indicator to the tagging location in the progress time period of the sports play video. For example, if a sports play video is a video in which sports play is being broadcast live, the progress time period of the sports play video may be a time period from an initial timing point at which the sports play video starts to a current timing point. For another example, if a sports play video is a video in which sports play is recorded and then later broadcasted, the progress time period of the sports play video may be a total time period of the sports play video. Accordingly, the processor 160 may proportionally check a tagging location in the progress time period of the sports play video, and may display the indicator of an event at the tagging location. In this case, the indicator may have various shapes and sizes. For example, as illustrated in FIG. 10, the processor 160 may display an indicator 1020 for the tagging location of an event in the progress bar 1010 of a sports play video 1000. Accordingly, while watching the sports play video 1000 using the electronic device, a service user may predict a location where an event occurs in the progress time period of the sports play video 1000 based on the progress bar 1010 and the indicator 1020.

In some embodiments, the processor 160 may provide tagging information in at least some of the sports play video 300. That is, while a service user watches the sports play video 1000 using the electronic device, the processor 160 may provide tagging information in at least some of the sports play video 300 in response to a request from the service user. To this end, the processor 160 may generate the tagging information using at least one of text broadcasting data or the sports play video 1000. In this case, the tagging information may indicate information related to at least one of an event or the tagging location of the event. This will be more specifically described with reference to FIG. 7.

Figure 12:
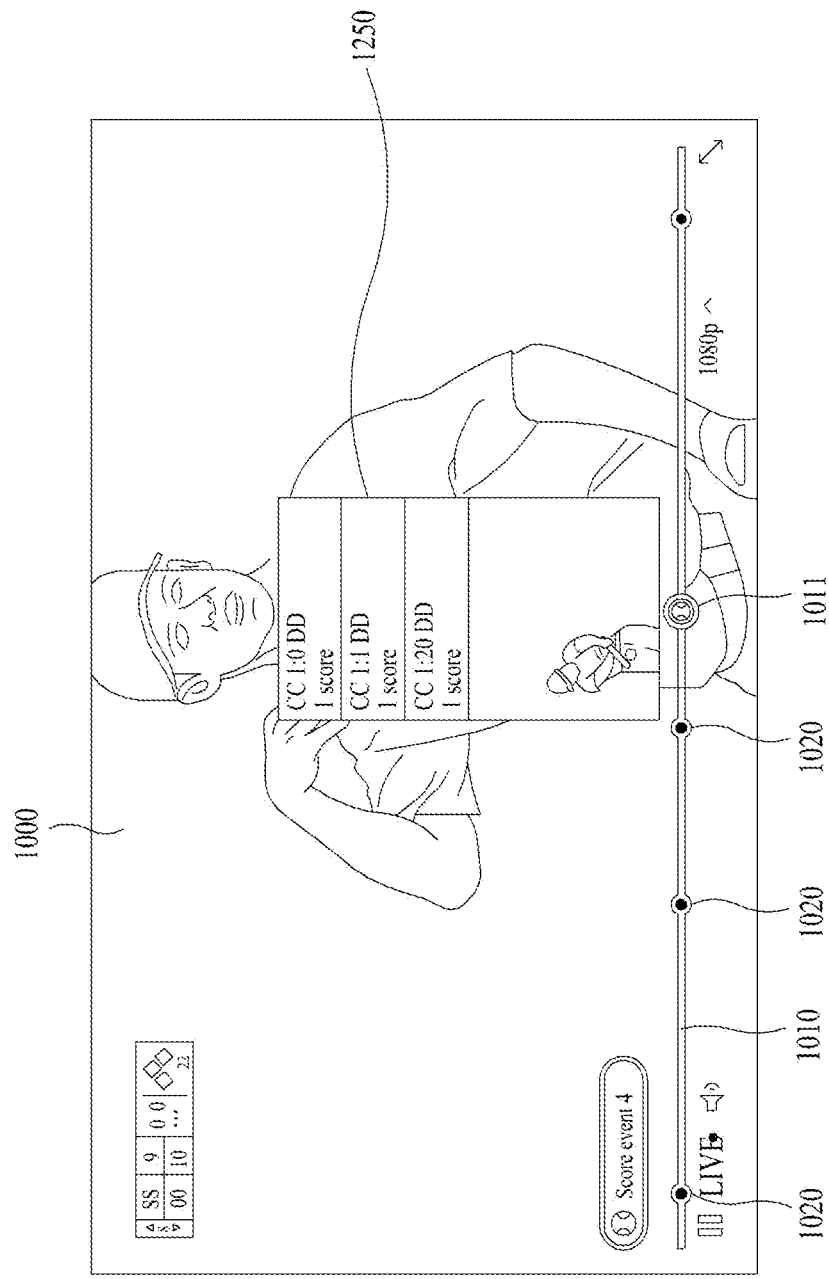

Referring to FIG. 7, at step 731, the electronic device 100 may display an indicator for the tagging location of an event in the progress bar of a sports play video. For example, as illustrated in FIG. 10, the processor 160 may display the indicator 1020 for the tagging location of an event in the progress bar 1010 of the sports play video 1000. For example, if the sport being played is baseball and an event is a score, the indicator 1020 for the tagging location of each score may be displayed in the progress bar 1010 of the sports play video 1000 for baseball. For another example, if the sport being played is soccer and an event is a score, the indicator 1020 for the tagging location of each score may be displayed in the progress bar 1010 of the sports play video 1000. For still another example, if the sport being played is golf and an event is a tee shot for each hole, the indicator 1020 for the tagging location of a tee shot for each hole may be displayed in the progress bar 1010 of the sports play video 1000 for golf. According to one embodiment, the progress bar 1010 includes a pointer 1011 (such as illustrated in FIG. 10 or FIG. 12). While a service user watches the sports play video 1000 using the electronic device, the pointer 1011 may be located at the end of the progress bar 1010. According to another embodiment, the processor 160 may further display, in the sports play video 1000, at least one function button 1030 to which a predetermined function has been assigned along with the progress bar 1010.

Figure 11:
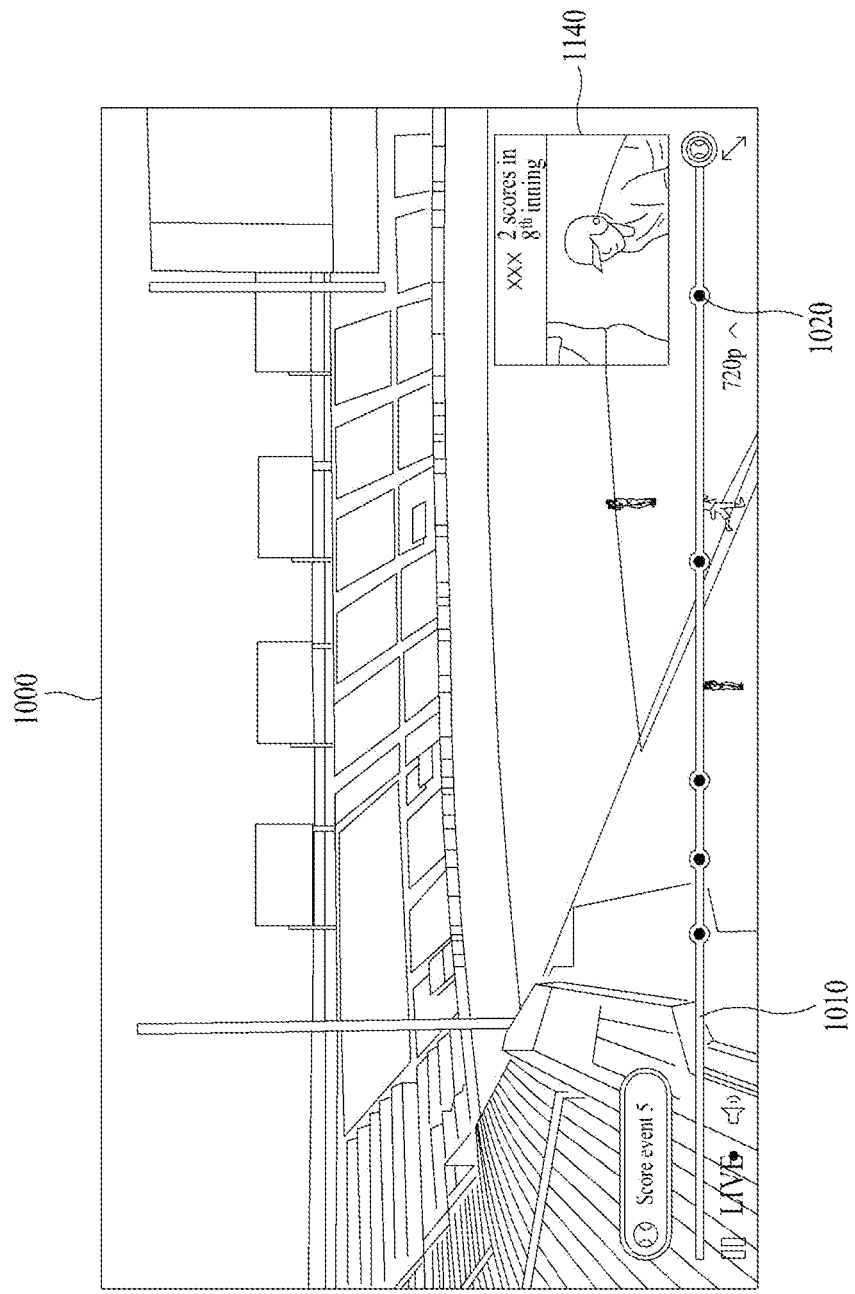

When a service user selects the indicator 1020 of the sports play video 1000 at step 733, at step 735, the electronic device 100 may provide tagging information in at least some of the sports play video 1000. When the service user selects the indicator 1020 while watching the sports play video 1000 using the electronic device, the processor 160 may detect the selected indicator. Accordingly, the processor 160 may provide, in at least some of the sports play video 300, tagging information related to the tagging location of the selected indicator 1020. In this case, the tagging information may include at least one of information on the event of the selected indicator 1020 or an event history up to the tagging location of the selected indicator 1020. For example, as illustrated in FIG. 11, the processor 160 may display, in at least some of the sports play video 1000, a box 1140 in proximity to the selected indicator 1020, and may provide tagging information through the box 1140. In this case, the tagging information may include at least one of at least some of the text broadcasted through text broadcasting data at an actual timing point of an event, the thumbnail of the event detected in the sports play video 1000, or a partial video of the event detected in the sports play video 1000. In this case, the partial video may be detected so that it starts from the tagging location in the sports play video 1000. For example, although not illustrated, when a service user additionally selects the box 1140, the processor 160 may enlarge the box 1140 in the sports play video 1000.

When a service user selects one location in the progress bar 1010 at step 737, at step 739, the electronic device 100 may provide, in at least some of the sports play video 1000, an event history up to the selected location. When the service user selects one location in the progress bar 310 while watching the sports play video 300 using the electronic device, the processor 160 may detect the selected location. Accordingly, the processor 160 may provide, in at least some of the sports play video 1000, an event history up to the selected location. In this case, the event history may indicate a list of pieces of tagging information. For example, as illustrated in FIG. 12, the processor 160 may display, in at least some of the sports play video 1000, a box 1250 in proximity to a selected location, and may provide an event history through the box 1250. In this case, the processor 160 may move the pointer 1011 to the selected location of the progress bar 1010, and may then display the box 1250 in proximity to the pointer 1011. For example, although not illustrated, when a service user additionally selects the box 1250, the processor 160 may enlarge the box 1250 in the sports play video 1000.

Although not illustrated, when a service user selects the function button 1030 in the sports play video 1000, the processor 160 may provide a function assigned to the function button 1030. For example, the function assigned to the function button 1030 may be a function for combining and providing partial videos of at least one event that has occurred so far. That is, the processor 160 may detect partial videos of an event in the sports play video 1000, and may combine and provide the detected partial videos. In this case, the processor 160 may display a box (not illustrated) in at least some of the sports play video 1000, and may provide a function through the box.

According to one embodiment, the sport being played may be baseball, an event may be a score, and a motion may be a pitching motion. In such a case, the electronic device 100 may display, at a tagging location corresponding to the pitching motion, an indicator for the score in the progress bar of a sports play video. Specifically, the electronic device 100 may map text broadcasting data and the sports play video based on the score. At this time, the electronic device 100 may confirm the occurrence location of the score in the sports play video and an actual timing point of the score in the text broadcasting data, and may map the occurrence location and the actual timing point. Furthermore, the electronic device 100 may detect the tagging location of the score in the sports play video. At this time, the electronic device 100 may recognize a predetermined pitching motion at a location prior to the occurrence location in proximity to the occurrence location of the score, and may detect the tagging location in the motion section of the corresponding pitching motion. Accordingly, the electronic device 100 may display the indicator for the tagging location of the score in the progress bar of the sports play video.

According to another embodiment, the sport being played may be soccer, an event may be a score, and a motion may be a shooting motion. In such a case, the electronic device 100 may display, at a tagging location corresponding to the shooting motion, an indicator for the score in the progress bar of a sports play video. Specifically, the electronic device 100 may map text broadcasting data and the sports play video based on the score. At this time, the electronic device 100 may confirm the occurrence location of the score in the sports play video and an actual timing point of the score in the text broadcasting data, and may map the occurrence location and the actual timing point. Furthermore, the electronic device 100 may detect the tagging location of the score in the sports play video. In this case, the electronic device 100 may recognize a predetermined shooting motion at a location prior to the occurrence location in proximity to the occurrence location of the score, and may detect the tagging location in the motion section of the corresponding shooting motion. Accordingly, the electronic device 100 may display the indicator for the tagging location of the score in the progress bar of the sports play video.

According to still another embodiment, the sport being played may be golf, an event may be a tee shot for each hole, and a motion may include a swing motion and a putting motion. In such a case, the electronic device 100 may display, at a tagging location corresponding to the swing motion or the putting motion, an indicator for a tee shot for each hole in the progress bar of a sports play video. Specifically, the electronic device 100 may map text broadcasting data and the sports play video based on the tee shot for each hole. At this time, the electronic device 100 may confirm the occurrence location of the tee shot for each hole in the sports play video and an actual timing point of the tee shot for each hole in the text broadcasting data, and may map the occurrence location and the actual timing point. Furthermore, the electronic device 100 may detect the tagging location of the tee shot for each hole in the sports play video. At this time, the electronic device 100 may recognize a predetermined swing motion or putting motion at a location prior to the occurrence location in proximity to the occurrence location of the tee shot for each hole, and may detect the tagging location in the motion section of the corresponding swing motion or putting motion. Accordingly, the electronic device 100 may display the indicator for the tagging location of the tee shot for each hole in the progress bar of the sports play video.

According to various embodiments, the electronic device 100 may provide the tagging of an event occurring in a sports play video during sports play. In this case, the electronic device 100 may more accurately provide the tagging of an event for a sports play video by mapping the text broadcasting data and the sports play video. That is, the electronic device 100 may provide the tagging of the event in the progress bar of the sports play video as an indicator. In this case, the electronic device 100 may provide tagging information related to the event using at least one of the text broadcasting data or the sports play video. For example, the tagging information may include at least one of at least some of text broadcasted in relation to the event, the thumbnail of the event detected in the sports play video, or a partial video of the event detected in the sports play video. Accordingly, a service user may predict a location where the event occurs within the sports play video based on the progress bar and the indicator, while watching the sports play video. Accordingly, the service user may watch a desired event again while watching the sports play video.

An operating method (FIG. 4) of the electronic device 100 according to various embodiments may include the step (step 410) of mapping text broadcasting data and a sports play video based on an event occurring during sports play, the step (step 420) of detecting a tagging location of the event in the sports play video, and the step (step 430) of displaying an indicator for the tagging location of the event in the progress bar of the sports play video.

According to various embodiments, the step (step 410) of the mapping of text broadcasting data and a sports play video may include the following steps of FIG. 5: the step (step 511) of confirming a location where the event occurs in the sports play video, the step (step 513) of checking an actual timing point of the event in the text broadcasting data, and the step (step 515) of mapping the occurrence location and the actual timing point.

According to various embodiments, the step (step 420) of the detecting of the tagging location may include the following steps of FIG. 6: the step (step 621) of recognizing a predetermined motion in association with the event in proximity to the occurrence location in the sports play video and the step (step 623) of detecting the tagging location based on the motion.

According to various embodiments, the method may further include the step of generating tagging information related to the tagging location using at least one of the text broadcasting data or the sports play video.

According to various embodiments, the method may further include the following steps of FIG. 7: the step (step 735) of providing the tagging information in at least some of the sports play video based on a selection of the indicator (step 733).

According to various embodiments, the tagging information may include at least one of at least some of text broadcasted at the actual timing point, a thumbnail of the event detected in the sports play video, or a partial video of the event detected so that the partial video starts at the tagging location in the sports play video.

According to various embodiments, the step (step 511) of confirming the occurrence location may include recognizing a score board in the sports play video, recognizing an event count in the score board, and confirming the location where the event occurs when the event count is changed.

According to various embodiments, the method may further include the following steps of FIG. 7: the step (step 739) of providing, in at least some of the sports play video, an event history up to a selected location based on the selection of the location in the progress bar (step 737).

According to one embodiment, if the sport being played is baseball, the event may include at least one of a score, a home run or first pitch for each batter, and the motion may include at least one of a swing motion or a pitching motion.

According to another embodiment, if the sport being played is soccer, the event may include a score, and the motion may include at least one of a pass motion for conversion between offense and defense or a shooting motion.

According to still another embodiment if the sport being played is golf, the event may include a tee shot for each hole, and the motion may include at least one of a swing motion or a putting motion.

The electronic device 100 according to various embodiments may include, as shown in FIG. 1, the memory 150 and the processor 160 coupled to the memory 150 and configured to execute at least one instruction stored in the memory 150.

According to various embodiments, the processor 160 may be configured to map text broadcasting data and a sports play video based on an event occurring during sports play, detect a tagging location of the event in the sports play video, and display an indicator for the tagging location of the event in a progress bar of the sports play video.

According to various embodiments, the processor 160 may be configured to confirm a location where the event occurs in the sports play video, check an actual timing point of the event in the text broadcasting data, and map the occurrence location and the actual timing point.

According to various embodiments, the processor 160 may be configured to recognize a predetermined motion in association with the event in proximity to the occurrence location in the sports play video and to detect the tagging location based on the motion.

According to various embodiments, the processor 160 may be configured to generate tagging information related to the tagging location using at least one of the text broadcasting data or the sports play video.

According to various embodiments, the processor 160 may be configured to provide the tagging information in at least some of the sports play video based on a selection of the indicator.

According to various embodiments, the tagging information may include at least one of at least some of text broadcasted at the actual timing point, a thumbnail of the event detected in the sports play video, or a partial video of the event detected so that the partial video starts at the tagging location in the sports play video.

According to various embodiments, the processor 160 may be configured to recognize a score board in the sports play video, recognize an event count in the score board, and confirm the location where the event occurs when the event count is changed.

According to various embodiments, the processor 160 may be configured to provide, in at least some of the sports play video, an event history up to a selected location based on the selection of the location in the progress bar.

According to one embodiment, if the sport being played is baseball, the event may include at least one of a score, a home run or first pitch for each batter, and the motion may include at least one of a swing motion or a pitching motion.

According to another embodiment, if the sport being played is soccer, the event may include a score, and the motion may include at least one of a pass motion for conversion between offense and defense or a shooting motion.

According to still another embodiment, if the sport being played is golf, the event may include a tee shot for each hole, and the motion may include at least one of a swing motion or a putting motion.

The aforementioned device may be implemented by a hardware component, a software component and/or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, a code, an instruction or a combination of one or more of them and may configure a processor so that the processor operates as desired or may instruct the processor independently or collectively. The software and/or the data may be embodied in any type of machine, component, physical device, virtual equipment or computer storage medium or device in order to be interpreted by the processor or to provide an instruction or data to the processor. The software may be distributed to computer systems connected over a network and may be stored or executed in a distributed manner. The software and the data may be stored in one or more computer-readable recording media.

The method according to various embodiments may be implemented in the form of a program instruction executable by various computer means and stored in a computer-readable recording medium. In this case, the medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in this document includes a unit configured as hardware, software or firmware, and may be interchangeably used with a term, such as logic, a logical block, a part or a circuit. The module may be an integrated part, a minimum unit to perform one or more functions, or a part thereof. For example, the module may be configured as an application-specific integrated circuit (ASIC).

According to various embodiments, each of elements (e.g., module or program) may include a single entity or a plurality of entities. According to various embodiments, one or more of the aforementioned elements or operations may be omitted or one or more other elements or operations may be added. Alternatively or additionally, a plurality of elements (e.g., modules or programs) may be integrated into a single element. In such a case, the integrated element may perform one or more functions of each of the plurality of elements identically or similarly to a function performed by a corresponding element of the plurality of elements before they are integrated. According to various embodiments, operations performed by a module, a program or other elements may be executed sequentially, in parallel, repeatedly, or heuristically, or one or more of the operations may be executed in different order or may be omitted, or one or more operations may be added.

According to various embodiments, the electronic device can provide the tagging of an event occurring in a sports play video during sports play. In this case, the electronic device can more accurately provide the tagging of the event for the sports play video by mapping text broadcasting data and the sports play video. That is, the electronic device can provide the tagging of the event in the progress bar of the sports play video as an indicator. In this case, the electronic device can provide tagging information related to the event using at least one of the text broadcasting data or the sports play video. For example, the tagging information may include at least some of text broadcasted in relation to the event, the thumbnail of the event detected in the sports play video, or at least one of partial videos of the event detected in the sports play video. Accordingly, a service user can predict a location where an event occurs in a sports play video based on the progress bar and the indicator, while watching the sports play video. Accordingly, the service user can watch a desired event while watching the sports play video.

What is claimed is:

1. An operating method of an electronic device, comprising:
    mapping text broadcasting data and a sports play video based on an event occurring during a sport being played in the sports play video;
    detecting a tagging location of the event in the sports play video; and
    displaying an indicator for the tagging location of the event in a progress bar of the sports play video,
    wherein the mapping of the text broadcasting data and the sports play video comprises:
        confirming a location where the event occurs in the sports play video;
        checking an actual timing point of the event in the text broadcasting data; and
        mapping the occurrence location and the actual timing point; and
    wherein the confirming of the occurrence location comprises using a processor to perform the following steps:
        recognizing a score board in the sports play video;
        recognizing an event count indicating a cumulative pitching number in a baseball match in the score board; and
        confirming the location where the event occurs when the event count is changed,
    wherein the detecting of the tagging location comprises using a processor to perform the following steps:
        recognizing a predetermined motion including a pitching motion of a player in the baseball match in association with the event in proximity to the confirmed occurrence location in the sports play video, wherein the predetermined motion comprises a combination of a plurality of actions that are each performed by a different player displayed in the sports play video, and further wherein the relative locations of the different players, or body parts thereof, are considered with respect to each other; and
        detecting the tagging location based on the motion.

2. The operating method of claim 1, further comprising:
    generating tagging information related to the tagging location using at least one of the text broadcasting data and the sports play video.

3. The operating method of claim 2, further comprising:
    providing the tagging information in at least some of the sports play video based on a selection of the indicator.

4. The operating method of claim 3, wherein the tagging information comprises at least one of at least some of text broadcasted at the actual timing point, a thumbnail of the event detected in the sports play video, and a partial video of the event detected so that the partial video starts at the tagging location in the sports play video.

5. The operating method of claim 1, further comprising:
    providing, in at least some of the sports play video, an event history up to a selected location based on the selection of the location in the progress bar.

6. The operating method of claim 1, wherein the number of different players is at least two different players that are considered during the step of recognizing a predetermined motion.

7. The operating method of claim 1, wherein the number of different players is at least three different players that are considered during the step of recognizing a predetermined motion.

8. A non-transitory computer-readable recording medium in which a program for executing the operating method of claim 1 in the electronic device is written.

9. An electronic device comprising:
    a memory; and
    a processor coupled to the memory and configured to execute at least one instruction stored in the memory,
    wherein the processor is configured to:
        map text broadcasting data and a sports play video based on an event occurring during a sport being played in the sports play video;
        detect a tagging location of the event in the sports play video; and
        display an indicator for the tagging location of the event in a progress bar of the sports play video, and
    wherein the processor is further configured to:
        confirm a location where the event occurs in the sports play video;
        check an actual timing point of the event in the text broadcasting data;
        map the occurrence location and the actual timing point;
        wherein the confirming of the occurrence location comprises:
            recognizing a score board in the sports play video;
            recognizing an event count indicating a cumulative pitching number in a baseball match in the score board; and
            confirming the location where the event occurs when the event count is changed, and
        recognize a predetermined motion including a pitching motion of a player of the baseball match in association with the event in proximity to the confirmed occurrence location in the sports play video, wherein the predetermined motion comprises a combination of a plurality of actions that are each performed by a different player displayed in the sports play video, and further wherein the relative locations of the different players, or body parts thereof, are considered with respect to each other; and
        detect the tagging location based on the motion.

10. The electronic device of claim 9, wherein the processor is configured to generate tagging information related to the tagging location using at least one of the text broadcasting data or the sports play video.

11. The electronic device of claim 10, wherein the processor is configured to provide the tagging information in at least some of the sports play video based on a selection of the indicator.

12. The electronic device of claim 11, wherein the tagging information comprises at least one of at least some of text broadcasted at the actual timing point, a thumbnail of the event detected in the sports play video, or a partial video of the event detected so that the partial video starts at the tagging location in the sports play video.

13. The electronic device of claim 9, wherein the processor is configured to provide, in at least some of the sports play video, an event history up to a selected location based on the selection of the location in the progress bar.

* * * * *